United States Patent
Stark et al.

(10) Patent No.: US 10,145,636 B2
(45) Date of Patent: Dec. 4, 2018

(54) REDUCTION OF FIRST SHOT NOISE IN FIREARM SOUND SUPPRESSORS

(71) Applicants: David B. Stark, Plainfield, NH (US); Martin F. Stark, Sherborn, MA (US); Anthony J. Parilllo, Sherborn, MA (US)

(72) Inventors: David B. Stark, Plainfield, NH (US); Martin F. Stark, Sherborn, MA (US); Anthony J. Parilllo, Sherborn, MA (US)

( * ) Notice: Subject to any disclaimer, the term of this patent is extended or adjusted under 35 U.S.C. 154(b) by 0 days.

(21) Appl. No.: 15/869,157

(22) Filed: Jan. 12, 2018

(65) Prior Publication Data

US 2018/0202743 A1 Jul. 19, 2018

Related U.S. Application Data

(60) Provisional application No. 62/446,609, filed on Jan. 16, 2017.

(51) Int. Cl.
*F41A 21/30* (2006.01)
*F16K 31/02* (2006.01)

(52) U.S. Cl.
CPC .............. *F41A 21/30* (2013.01); *F16K 31/02* (2013.01)

(58) Field of Classification Search
CPC .......... F41A 21/30; F41A 21/28; F41A 21/32; F41A 21/325; F41A 21/34; F16K 31/02
USPC ............................ 89/14.1–14.5, 14.2; 42/1.06
See application file for complete search history.

(56) References Cited

U.S. PATENT DOCUMENTS

| | | | | |
|---|---|---|---|---|
| 2,010,178 A | * | 8/1935 | De Bruin | F41A 21/34 89/1.2 |
| 2,146,554 A | * | 2/1939 | Rossmann | F41A 13/12 89/14.1 |
| 3,272,074 A | * | 9/1966 | Vinson | F41A 21/34 144/144.1 |
| 3,710,679 A | * | 1/1973 | Werbell, III | F41A 21/30 89/14.4 |
| 4,392,412 A | * | 7/1983 | Schmidt | F41A 21/30 169/49 |
| 5,245,905 A | * | 9/1993 | Bundy | F41A 13/08 89/1.2 |
| 5,610,360 A | | 3/1997 | Kazyaka et al. | |
| 5,966,858 A | * | 10/1999 | Curtis | F41A 21/32 42/1.14 |
| 6,658,983 B2 | | 12/2003 | Kazyaka et al. | |

(Continued)

OTHER PUBLICATIONS

"Air Chuck" [product webpage] published by Genuine Innovations, San Luis Obispo, CA., [retrieved on Jan. 15, 2017] retrieved from URL: https://www.genuineinnovations.com/uk/products/inflators/air-chuck.php.

(Continued)

*Primary Examiner* — John Cooper
(74) *Attorney, Agent, or Firm* — Jeffrey E. Semprebon

(57) ABSTRACT

First round shot noise and flash caused by combustion of oxygen contained in the air residing in a firearm sound suppresser can be reduced by providing a valve that communicates with the baffled interior space of the suppressor, and connecting a source of non-flammable gas such as $CO_2$ to the valve in order to inject the gas into the suppressor. The non-flammable gas displaces the air in the suppressor, removing the oxygen available for combustion when the first shot is fired.

16 Claims, 3 Drawing Sheets

(56) References Cited

U.S. PATENT DOCUMENTS

| | | | | |
|---|---|---|---|---|
| 7,237,353 | B1* | 7/2007 | Beauchamp | F41A 21/36 42/1.14 |
| 7,516,690 | B2 | 4/2009 | McClellan | |
| 8,046,947 | B2* | 11/2011 | Fu | F41A 21/32 114/316 |
| 9,732,038 | B2 | 8/2017 | Daniels et al. | |
| 2014/0262605 | A1* | 9/2014 | Washburn, III | F41A 21/30 181/223 |
| 2015/0308772 | A1* | 10/2015 | James | F41A 21/30 89/14.4 |

OTHER PUBLICATIONS

"AirChuck" [electronic instruction sheet], published by Genuine Innovations, San Luis Obispo, CA., [retrieved on Jan. 15, 2017] retrieved from URL: https://storage.googleapis.com/genuineinnovations-com/uploads/13806030262673_AirChuck.pdf.

"Full Metal Jacket" [product webpage] published by Genuine Innovations, San Luis Obispo, CA., [retrieved on Jan. 15, 2017] retrieved from URL: https://www.genuineinnovations.com/uk/products/inflators/fullmetaljacket-20-gram.php.

"FMJ Instructions" [electronic instruction sheet], published by Genuine Innovations, San Luis Obispo, CA., [retrieved on Jan. 15, 2017] retrieved from URL: https://storage.googleapis.com/genuineinnovations-com/uploads/G20440_FMJ_Instructions.pdf.

"Any silencers with no first round pop?" [online forum thread] published by RimfireCentral.com 2014-2017 [retrieved on Feb. 6, 2018], retrieved from URLs http://www.rimfirecentral.com/forums/showthread.php?t=551266 and http://www.rimfirecentral.com/forums/showthread.php?s=eb73e23084619983d6f31d2a156c5158&t=551266&page=2.

"Questions on first round pop . . . Prevention, Frequency, etc" [online forum thread] published by SilencerTalk.com 2012 [retrieved on Feb. 7, 2018], retrieved from URLs http://www.silencertalk.com/forum/viewtopic.php?t=87832 and http://www.silencertalk.com/forum/viewtopic.php?f=28d=87832&sid=3070209a704dt7c611eda2c58a3b1d82&start=25.

* cited by examiner

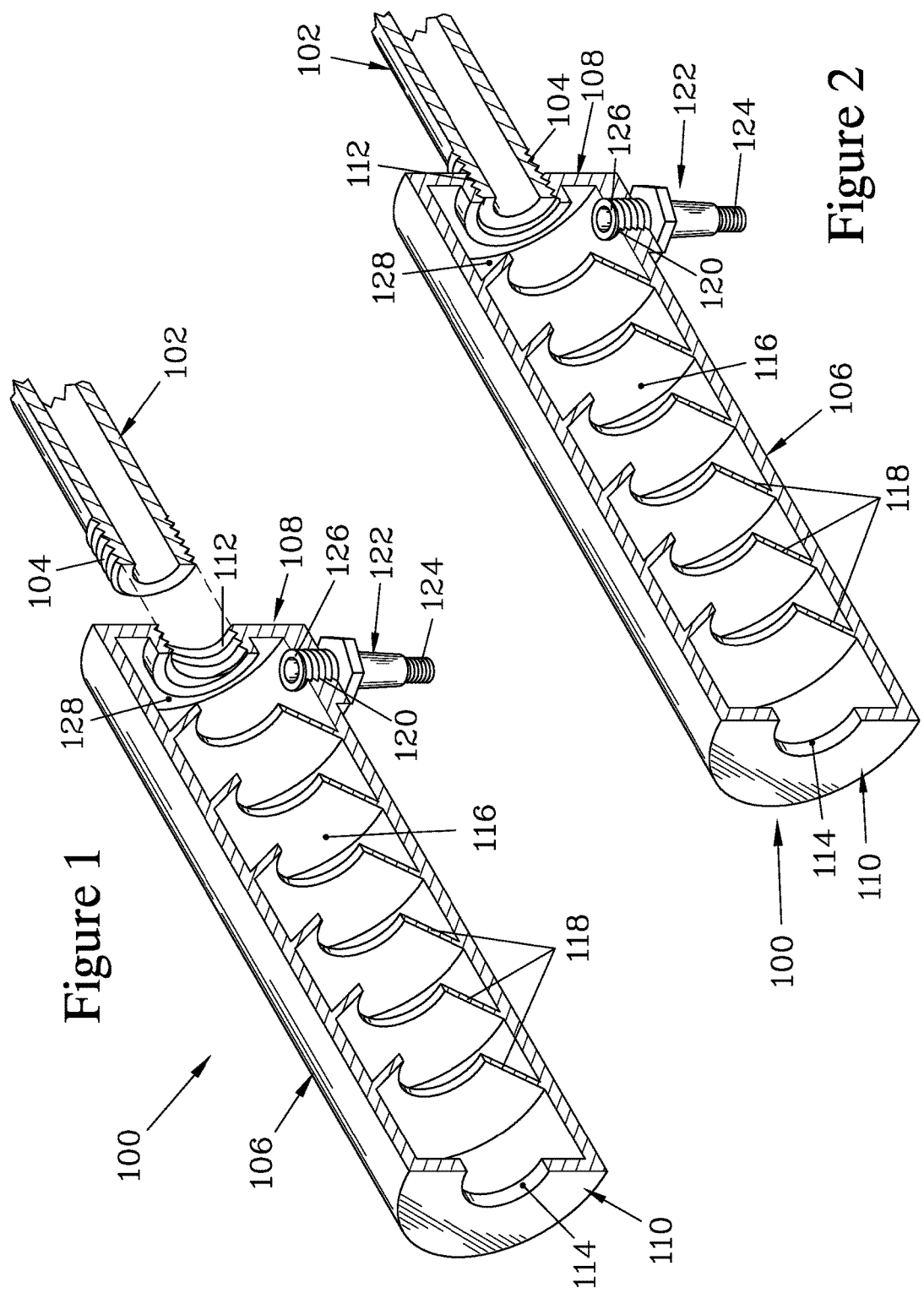

REDUCTION OF FIRST SHOT NOISE IN FIREARM SOUND SUPPRESSORS

FIELD OF THE INVENTION

The present invention relates to firearm suppressors employed to reduce the sound signature of gunshots.

BACKGROUND

Sound suppressors are mounted onto firearms to control the expansion of muzzle gases to reduce the sound intensity of the shots fired. The reduction in sound can aid in reducing hearing damage to the shooter and reduce noise to avoid disturbance to others in the vicinity of the shooter. The suppressor may also reduce muzzle flash, and thus aid in concealing the location of the shooter. The sound suppressor secures onto the barrel of the firearm, typically via a threaded connection, and encloses a baffled interior space into which the muzzle gases expand. The baffled interior is configured to control expansion of the muzzle gases to reduce the resulting sound intensity.

It has been found that the first shot fired through a sound suppressor frequently is louder than following shots, due to the hot muzzle gases burning in the oxygen contained in the residual air in the baffled interior space. This is frequently referred to as "first round pop" or FRP. To avoid this additional noise, users may attempt to inject a non-flammable gas such as carbon dioxide ($CO_2$) from a source of compressed gas into the suppressor to displace the residual air. Since this operation is typically conducted while a live round is chambered, it requires the user to place their hands in proximity to the exit of the suppressor, in line with the muzzle, to inject the gas; this creates an inherently unsafe condition, as well as being inconvenient.

SUMMARY

The present invention provides an apparatus and method that allow the user of a suppressed firearm to safely and conveniently inject a non-flammable gas into a baffled interior space of the suppressor to displace residual air and reduce "first round pop" (FRP). The invention can be incorporated into a suppressor, or can employ a suppressor mounting device to allow the use of a pre-existing suppressor; in this latter case, the mounting device typically mounts to the barrel of the firearm, and the suppressor is mounted onto the mounting device so as to be aligned with and in communication with the firearm barrel. In either case, the invention provides a valve that connects between a source of compressed gas and the baffled interior space of the suppressor. The valve can be selectively actuated by the user to introduce the non-flammable gas, causing this gas to displace residual air in the interior of the suppressor. With the interior filled with non-flammable gas, the combustion of residual oxygen caused by the first shot is avoided. Various non-flammable and/or inert gases can be employed, such as carbon dioxide, nitrogen, argon, etc.; carbon dioxide ($CO_2$) is frequently preferred due to its low cost.

The source of the compressed non-flammable gas can be either an independent gas source or a dedicated source; in the latter case, the gas source is typically mounted onto either the firearm or the suppressor.

In the case where an independent gas source is employed, the valve may be configured so as to be activated when the gas source is brought into contact with the valve. In such cases, the valve may have a valve first end and a valve second end, where the valve first end is configured to receive and seal against the gas source, and the valve second end communicates with the baffled interior space of the suppressor. The valve acts to allow passage of gas from the valve first end into the baffled interior space via the valve second end when a source of compressed gas is connected to the valve first end, and acts to block passage of gases therethrough when no source of compressed gas is connected to the valve first end. Thus, when a compressed gas source is connected to the valve first end, the valve is opened to allow the compressed gas through the valve into the baffled interior space of the suppressor to displace residual air. When the compressed gas source is disconnected from the valve first end, the valve is closed so as to prevent escape of muzzle gases through the valve when the firearm is discharged.

One preferred type of valve that can be employed is a Schrader valve, allowing the use of commercially available sources of compressed $CO_2$ to be connected to the valve first end. One such gas source is a commercially-available handheld unit intended for inflating bicycle tires, the device having a body that accepts a conventional canister of compressed $CO_2$ and a head that connects to a Schrader valve and has a manually operated device valve that allows the user to manually open the device valve to allow the compressed $CO_2$ into the Schrader valve, and subsequently close the device valve to contain the remaining compressed $CO_2$. The valve employed in the present invention may be permanently attached, such as by welding, brazing, or similar techniques, or may be replaceably attached such as by threads to allow it to be replaced if worn. In some cases, it may be advisable to replace the valve after a certain number of shots have been fired; many suppressors have internal baffle components that require periodic replacement, and the valve can be designed to be replaced when the internal components are.

As noted above, a dedicated gas source mounted onto the firearm or suppressor can be employed. In such cases, the compressed gas source is typically a pressurized canister mounted to the firearm or suppressor, and communicates with the baffled interior space of the suppressor via a manually-activated valve and associated gas supply line. The configuration of the valve and gas supply line can be selected to suit the location where the gas canister is mounted and the desired position for activating the valve, and the valve may be controlled by direct manipulation or may have a remote control, such as an electrically-activated valve operated by a remote switch positioned for the convenience of the user; hereafter, the combination of the valve and related elements are collectively referred to as the valve, regardless of the exact configuration employed. The use of a dedicated gas source may be particularly advantageous for long guns, where the length of the barrel results in the suppressor being positioned too far forward to be conveniently reached by the user while holding the firearm. It may be advantageous to place the valve in the immediate proximity of the suppressor or mounting device, to reduce the exposure of components to hot propellent gases; in such cases, remote activation of the valve may be particularly convenient.

The valve and related elements may be mounted to the firearm by conventional mounting means, such as by clamping components onto accessory rails provided on the firearm, or may be incorporated into one or more replacement firearm components, such as a replacement stock and/or forearm. The activation of the valve can be momentary, such that the valve is closed except when actively opened by the action of the user, or can be set to deliver a prescribed amount of gas responsive to an action by the user.

Regardless of whether an independent or dedicated gas source is employed, the valve can be incorporated into the suppressor. The valve is mounted to a suppressor body so as to communicate with the baffled interior space of the suppressor. Suppressors typically have a suppressor first end, provided with female threads or other mounting structure to securely attach to a corresponding thread or other mounting structure on a barrel of the firearm, and a suppressor second end having a suppressor exit through which a fired bullet passes and through which muzzle gases may escape after being slowed and cooled by their passage through the baffled interior space. It is generally preferred for the valve to be positioned near the suppressor first end, communicating with the initial blast chamber, the section of the interior space into which the propellent gases first expand upon entering the suppressor. This positioning enables the injected non-flammable gas to push the residual air in the baffled interior space toward the suppressor exit. At the time when the non-flammable gas is injected, the firearm typically has a round of ammunition chambered, closing the breach end of the barrel, and thus the only path for escape of gases is through the suppressor exit. When a separate gas source is employed, positioning the valve near the suppressor first end also serves to distance the hands of the user from the suppressor exit for increased safety when bringing the gas source into engagement with the valve.

When a pre-existing suppressor is to be employed, the valve can be provided in an intermediate mounting device attached between the suppressor and the firearm barrel. In this case, the mounting device typically has a mount body having a mount first end and a mount second end, where the mount first end has a first end mounting structure configured to removably secure onto the barrel mounting structure provided on the firearm barrel, and the mount second end has a second end mounting structure that is configured to allow the suppressor mounting structure to securely attach thereto. Typically, the barrel mounting structure is provided by male threads, and the first end mounting structure is provided by corresponding female threads. Similarly, the suppressor mounting structure is typically provided by female threads, and the second end mounting structure is provided by corresponding male threads. It should be appreciated that the threads on the mount first end may not correspond to the threads on the mount second end, allowing the mounting device to serve as a thread adapter to allow mounting the suppressor to a firearm having a different thread pattern than the one for which the suppressor is designed. It should also be appreciated that the mounting device could be a multi-piece structure, such as a two-part suppressor mount intended to facilitate rapid attachment and detachment of the suppressor with less effort than required to screw and unscrew the threads.

The mount body encloses a mount interior space, which is configured to allow the passage of a bullet therethough without obstruction and which communicates with the baffled interior space of the sound suppressor when the suppressor mounting structure is secured onto the second end mounting structure. The valve is attached to the mount body such that the valve communicates with the mount interior space, which in turn communicates with the baffled interior space of the suppressor. Thus, when the valve is activated, the non-flammable gas is delivered from the source through the valve into the mount interior space and from there into the baffled interior space of the suppressor, displacing the residual air.

BRIEF DESCRIPTION OF FIGURES

FIGS. 1 and 2 are sectioned isometric views that illustrate a sound suppressor that forms one embodiment of the present invention, which is designed for use with a pre-existing source of non-flammable gas such as a $CO_2$ inflator commonly employed for inflating bicycle tires. The suppressor has a suppressor body that encloses a baffled interior space, and a valve mounted to the suppressor body allows a user to inject gas into the baffled interior space to displace residual air. FIG. 1 illustrates the suppressor prior to mounting onto the firearm barrel, while FIG. 2 illustrates the sound suppressor when secured onto the barrel of a firearm by a threaded connection. The valve is a Schrader-type valve, which is designed to open when a corresponding gas supply device is engaged against the valve.

DETAILED DESCRIPTION

Figure 3:
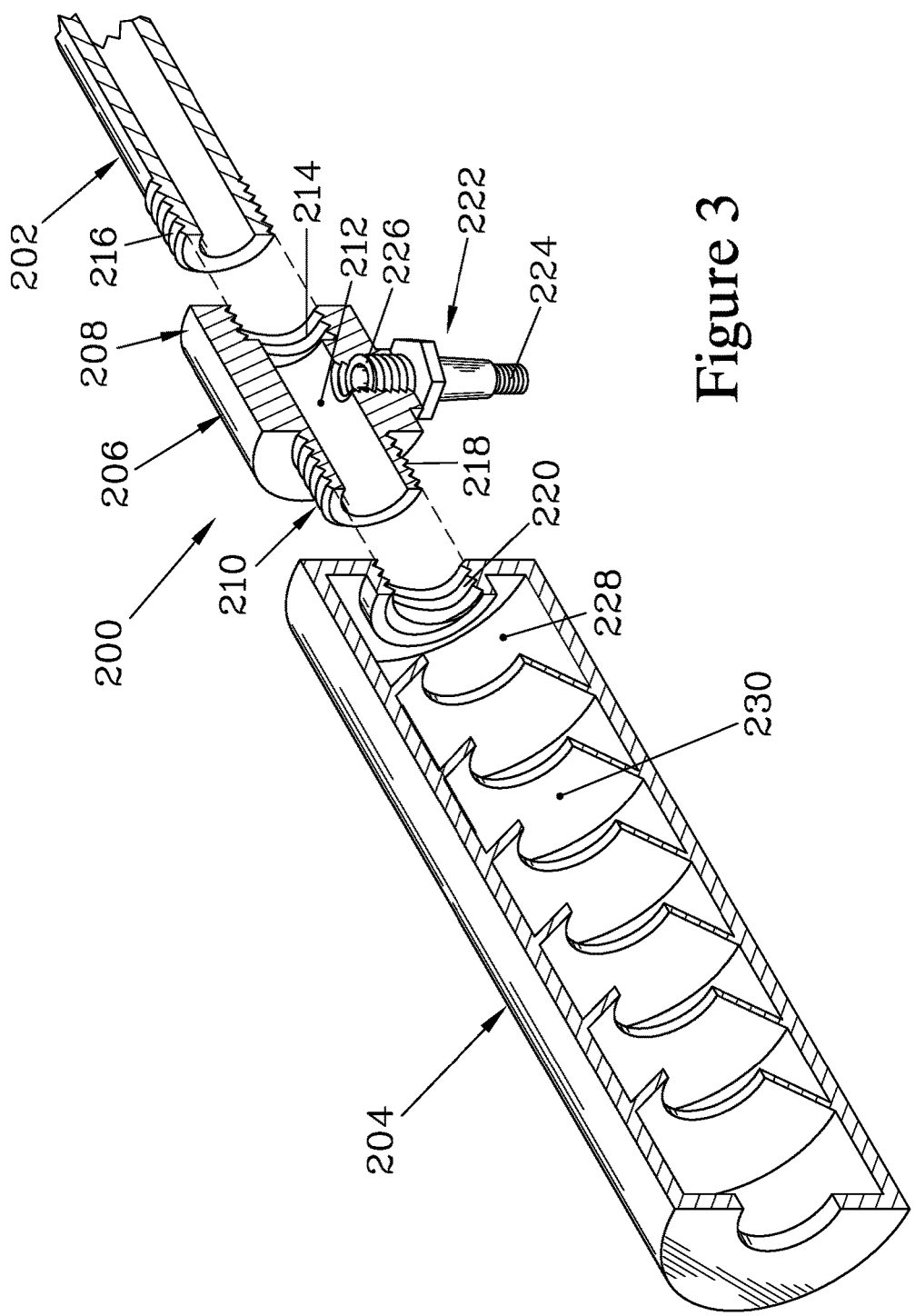
FIG. 3 is a sectioned isometric view that illustrates a suppressor mounting device that forms another embodiment of the present invention, which allows the use of a pre-existing suppressor. The mounting device has a mount body into which a valve communicates, and can be secured between the firearm barrel and the suppressor.

FIGS. 1 and 2 illustrate a sound suppressor 100 for attachment to a firearm barrel 102, and which incorporates one embodiment of the present invention. FIG. 1 illustrates the suppressor 100 prior to installation onto a barrel mounting structure 104 provided on the firearm barrel 102, while FIG. 2 illustrates the suppressor 100 after installation. In this embodiment, the barrel mounting structure 104 is provided by a male thread.

The suppressor 100 has a suppressor body 106 having a suppressor first end 108 and a suppressor second end 110. The suppressor first end 108 is provided with a suppressor mounting structure 112 that is configured to securely, removably mount onto the barrel mounting structure 104. In the embodiment illustrated, the suppressor mounting structure 112 is provided by a female thread that matches the male thread that provides the barrel mounting structure 104, allowing the suppressor first end 108 to be screwed onto the barrel mounting structure 104, as shown in FIG. 2. The suppressor second end 110 is provided with a suppressor exit 114 to allow passage of a bullet out of the suppressor 100.

The suppressor body 106 encloses a baffled interior space 116, which contains a series of baffles 118 that serve to control the expansion of muzzle gases from the firearm barrel 102 while allowing passage of a bullet through the baffled interior space 116. It should be appreciated that the details of the baffles 118 are not a part of the present invention, and the use of any interior structure designed to reduce the sound of escaping muzzle gases could be employed.

The suppressor body 106 has a body threaded passage 120, into which a valve 122 is screwed. The valve 122 can be readily replaced if worn or damaged. The valve 122 illustrated is a Schrader valve, and has a valve first end 124 that is configured to connect to a conventional source of compressed gas. One convenient source of gas is a commercially available device used for inflating bicycle tires, having a body that connects onto a conventional canister of compressed $CO_2$ and a head with a manually-operated device valve that can be opened against to release the compressed $CO_2$ from the canister into the Schrader valve. For convenient use, it is preferred to use a push-on inflation device that does not require being threaded onto the Schrader valve; two examples of such push-on inflation devices are the Full Metal Jacket and Air Chuck models offered by Genuine Innovations of San Luis Obispo, Calif.

The valve 122 has a valve second end 126 that communicates with the baffled interior space 116. The valve 122 acts to allow passage of gas from the valve first end 124 through the valve second end 126 into the baffled interior space 116 when a source of compressed gas is connected to the valve first end 124, and acts to block passage of gases through the valve 122 when no source of compressed gas is connected to the valve first end 124, thereby acting to prevent escape of hot propellant gases through the valve 122 when the firearm is discharged.

The valve 122 is positioned near the suppressor first end 108, and communicates with an initial blast chamber 128 of the interior space 116; the initial blast chamber 128 is the first portion of the baffled interior space 116 into which the propellent gases expand when the firearm is discharged. The position of the valve 122 allows the user to readily apply the compressed gas source while keeping their hands clear of the suppressor exit 114, and allows the injected $CO_2$ to push air residing in the baffled interior space 116 toward the suppressor exit 114 to facilitate removal of the oxygen-containing air from the baffled interior space 116. Since the firearm barrel 102 is typically closed at its breach end by a chambered round of ammunition when the $CO_2$ is injected, the suppressor exit 114 is the only path for escape of gases.

While the present invention can be incorporated directly into a sound suppressor, as shown in FIGS. 1 and 2, some users may wish to obtain the benefit of the present invention while employing a pre-existing suppressor. FIG. 3 illustrates a suppressor mounting device 200 that is designed to be interposed between a firearm barrel 202 and a pre-existing suppressor 204.

The mounting device 200 has a mount body 206 having a mount first end 208 and a mount second end 210, and encloses a mount interior space 212. The mount first end 208 has a first end mounting structure 214 configured to removably secure onto a barrel mounting structure 216 provided on the firearm barrel 202; as illustrated, these mounting structures (214, 216) are provided by matching threads. The mount second end 210 is provided with a second end mounting structure 218 that is configured to attach to a suppressor mounting structure 220 of the suppressor 204; again, these mounting structures (218, 220) are typically provided by matching threads.

The mounting device 200 is provided with a valve 222, which again can be provided by a Schrader valve having a valve first end 224 designed to connect to conventional $CO_2$ bicycle tire inflators or similar devices. The valve 222 also has a valve second end 226, which communicates with the mount interior space 212. The mount interior space 212 is configured to leave a clear path therethrough to avoid obstructing the passage of a bullet from the firearm barrel 202 into the suppressor 204. When the suppressor 204 is mounted to the second end mounting structure 218, the mount interior space 212 communicates with an initial blast chamber 228 of a baffled interior space 230 of the suppressor 204, and thus the valve second end 226 communicates with the baffled interior space 230 via the mount interior space 212. When a $CO_2$ bicycle tire inflator or other source of compressed gas is connected to the valve first end 224, the compressed non-flammable gas can flow through the valve 222 into the mount interior space 212 via the valve second end 226, and thereafter can pass into the baffled interior space 230 to displace oxygen-containing air residing in the suppressor 204.

While the suppressor mounting device 200 illustrated is a single-piece device, the present invention can be incorporated into multi-part suppressor mounting devices, such as the Gemtech QDA suppressor mounting device offered by Gemini Technologies, Inc. of Eagle, Id. The Gemtech QDA adapter is intended to allow a user to readily switch a single suppressor between multiple firearms, and has a base portion, which threads onto a firearm barrel, and a suppressor portion, onto which the suppressor threads. The two portions are connected together by a quick-detaching bayonet-type locking structure. When a mounting device of the present invention employs such a structure, the valve could be provided in either of the portions, but is preferably provided on the suppressor portion to simplify the structure of the base portion, as the user may want multiple base portions to equip a number of firearms.

While the embodiments discussed above employ a separate gas source such as a bicycle tire inflator that is manually brought into contact with the valve to inject the non-flammable gas, in some cases it may be preferred to employ a dedicated gas source that remains attached to the firearm. This may be particularly true for rifles, where the length of the barrel makes it unwieldy for the user to position a compressed gas source into contact with a valve located near the muzzle.

Figure 4:
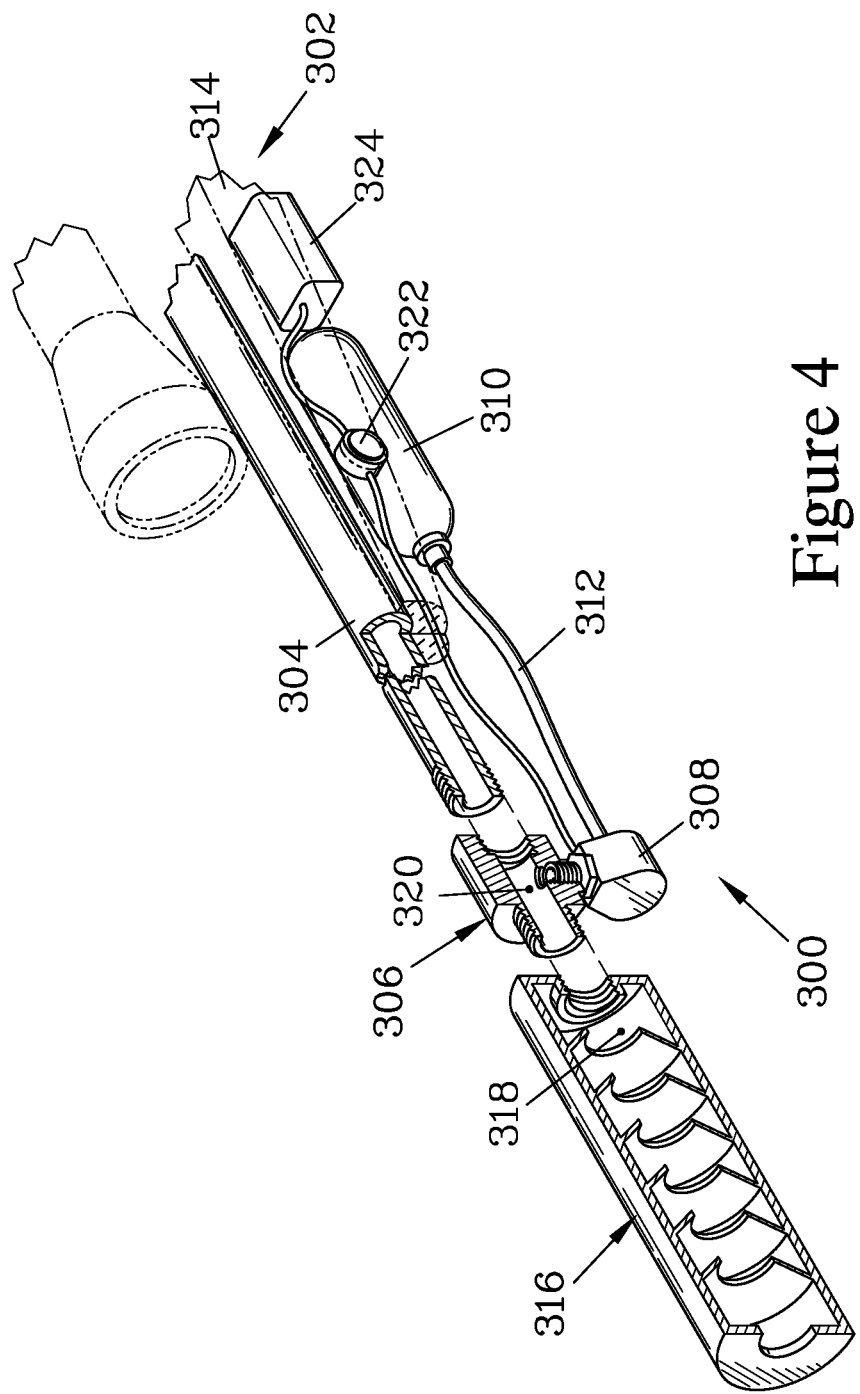
FIG. 4 is a sectioned isometric view that illustrates another suppressor mounting device for attaching a pre-existing suppressor onto a firearm barrel. However, the mounting device of this embodiment is designed for use with a dedicated gas source, which is a compressed gas canister mounted to the firearm. The mounting device has a mount body and a valve, where the valve is an electrically-operated valve controlled by a switch positioned on the firearm in a location convenient for the user.

FIG. 4 illustrates a noise reducing system 300 that remains attached to a firearm 302 having a barrel 304. The system 300 includes a suppressor mounting device 306 that attaches to the barrel 304 (and could be permanently affixed thereto), a valve 308, and a compressed gas source 310 which is connected to the valve 308 by a gas supply line 312. The compressed gas source 310 is a canister of non-flammable gas such as $CO_2$, and in this embodiment is at least partially housed in a forearm 314 (shown in phantom) of the firearm 302.

The mounting device 306 illustrated is functionally similar to the mounting device 200 discussed above; the mounting device 306 attaches onto the barrel 304 and in turn provides a mounting to attach a sound suppressor 316 having an interior baffled space 318. When the suppressor 316 is mounted, the baffled interior space 318 communicates with a mount interior space 320 of the mounting device 306. The valve 308 communicates with the mount interior space 320.

The valve 308 of this embodiment is an electrically-operated valve, which can be opened by the user by pressing a switch 322 that is positioned on the forearm 314 where it can be conveniently reached by the user while holding the firearm 302. A battery 324 serves to power the valve 308, and the switch 322 can be a momentary-on switch that remains closed, opening the valve 308 to release gas into the mount interior space 320, only as long as it is manually depressed by the user. While an electrically-operated valve is illustrated, alternative types of valves and controls could be employed. The valve can open with a momentary response, where it remains open so long as pressure is applied by the user, or could be metered or electronically controlled to open for a prescribed time in response to a single activation by the user, to deliver a specified amount of gas sufficient to displace the residual air in the baffled interior space 318. The use of compressed gas cylinders and control valves is well known in the art of airguns employed to shoot paintballs, and similar techniques can be readily adapted for the present invention.

Preliminary testing of a device of the present invention similar to that shown in FIG. 3 resulted in a noticeably reduced sound for the first round fired when employed with a Walther PPX pistol, a Gemtech Multimount 9 sound suppressor, and Ultramax 9 mm 147 gr FMJ subsonic ammunition. In addition to reducing the overall sound level of gunshots, the use of the present invention to inject $CO_2$ to displace residual air was found to alter the sound characteristic of the shot, resulting in a tone with a flatter, less percussive impression.

While the novel features of the present invention have been described in terms of particular embodiments and preferred applications, it should be appreciated by one skilled in the art that substitution of materials and modification of details can be made without departing from the spirit of the invention.

The invention claimed is:

1. An apparatus for allowing a user to inject a non-flammable gas from a pre-existing source of compressed non-flammable gas into a baffled interior space of a sound suppressor mounted to a barrel of a firearm, the apparatus comprising:
    a selectively activatable valve having a valve first end configured to be manually connectable to the pre-existing source of compressed non-flammable gas; and
    a valve second end communicating with the baffled interior space, said valve being biased to a closed state, and being opened against such bias by action of the user engaging the pre-existing source of compressed non-flammable gas with said valve first end, and
        wherein said valve is configured to allow the non-flammable gas to flow through said valve from said valve first end into the baffled interior space via said valve second end when the pre-existing source of compressed gas is connected to said valve first end, and acts to block passage of gases therethrough when no source of compressed gas is connected to said valve first end.

2. The apparatus of claim 1 wherein said valve is mounted to the suppressor.

3. The apparatus of claim 2 wherein said valve releases the gas into an initial blast chamber of the baffled interior when the pre-existing source of compressed gas is connected to said valve first end such that said valve is open.

4. The apparatus of claim 1 wherein said valve is a Schrader valve.

5. An apparatus for allowing a user to inject a non-flammable gas into a baffled interior space of a sound suppressor mounted to a barrel of a firearm, the apparatus comprising:
    a suppressor mounting device that mounts between the sound suppressor and the firearm barrel, and having a mount interior space; and
    a selectively activatable valve communicating with the baffled interior space and connectable to a source of the non-flammable gas, said valve being biased to a closed state, and being openable by an action of the user, and when opened allowing the non-flammable gas to flow through said valve into the baffled interior space,
        wherein said valve is provided in said suppressor mounting device and communicates with the baffled interior space via said mount interior space.

6. The apparatus of claim 5 wherein the source of non-flammable gas is a pre-existing source of compressed gas, and further wherein said valve further comprises:
    a valve first end configured to connect to the pre-existing source of compressed gas; and
    a valve second end communicating with said mount interior space,
        wherein said valve is configured to allow passage of gas from said valve first end into said mount interior space via said valve second end when the pre-existing source of compressed gas is connected to said valve first end, and acts to block passage of gases therethrough when no source of compressed gas is connected to said valve first end, such that the user engaging the pre-existing source of compressed gas with said valve first end acts to open said valve.

7. The apparatus of claim 6 wherein said valve is a Schrader valve.

8. The apparatus of claim 5 further comprising:
    a dedicated source of compressed gas mounted with respect to the firearm and communicating with said valve so as to provide the source of non-flammable gas; and
    a switch that controls the valve to allow the user to selectively open said valve by operating said switch.

9. The apparatus of claim 5 where the suppressor has,
    a suppressor body having a suppressor first end and a suppressor second end and enclosing the baffled interior space, which is configured to control expansion of muzzle gases while not obstructing passage of a bullet through said baffled interior space, the bullet exiting through a suppressor exit in the suppressor second end, and
    a suppressor mounting structure provided in the suppressor first end and configured to removably secure onto a barrel mounting structure of a firearm,
    wherein said suppressor mounting device further comprises:
        a mount body having a mount first end and a mount second end, said mount first end having a first end mounting structure configured to removably secure onto the barrel mounting structure of the firearm to which the sound suppressor is to be mounted, and said mount second end having a second end mounting structure configured to removably secure to said suppressor mounting structure,
        said mount interior space being provided in said mount body and being configured to avoid obstructing passage of a bullet therethrough and communicating with the baffled interior space of the sound suppressor when said suppressor mounting structure and said second end mounting structure are secured together; and
    further wherein said valve has a valve first end and a valve second end, said valve first end being connectable to the source of non-flammable gas and said valve second end communicating with said mount interior space, said valve, when opened, allowing passage of gas from said valve first end into said mount interior space via said valve second end.

10. The apparatus of claim 9 wherein the source of non-flammable gas is a pre-existing source of compressed gas, and further wherein said valve is configured to allow passage of gas from said valve first end into said mount interior space via said valve second end when the pre-existing source of compressed gas is connected to said valve first end, and acts to block passage of gases therethrough when no source of compressed gas is connected to said valve first end.

11. The apparatus of claim 9 wherein the source of non-flammable gas is provided by a source of compressed gas that remains connected to said valve first end during use, and further wherein said valve is actuated by a remote switch mounted to the firearm.

12. A method for injecting a non-flammable gas into a baffled interior space of a sound suppressor mounted to a barrel of a firearm, the method comprising the steps of:
providing a selectively activatable valve that communicates with the baffled interior space;
inserting a suppressor mounting device having a mount interior space between the firearm barrel and the suppressor such that the mount interior space communicates with the baffled interior space of the suppressor, the valve being mounted to the suppressor mounting device so as to communicate with the baffled interior space via the mount interior space;
connecting the valve to a source of non-flammable gas; and
selectively opening the valve to allow the non-flammable gas to flow through the valve into the baffled interior space.

13. The method of claim 12 wherein the valve communicates with an initial blast chamber of the baffled interior.

14. The method of claim 12 wherein said valve is configured to engage with a pre-existing compressed gas source to serve as the source of non-flammable gas and to open responsive to such engagement, further wherein said steps of connecting the valve to a source of non-flammable gas and selectively opening the valve, in combination, further comprise:
bringing the pre-existing compressed gas source into engagement with the valve to connect to and open the valve.

15. The method of claim 12 wherein said step of connecting the valve to a source of non-flammable gas further comprises the steps of:
providing a dedicated source of compressed gas to serve as the source of non-flammable gas; and
connecting the dedicated source of compressed gas to the valve.

16. The method of claim 15 wherein said step of selectively opening the valve further comprises the steps of:
providing a switch that opens the valve when activated; and
selectively operating the switch.

* * * * *